United States Patent [19]

Ashley et al.

[11] Patent Number: 4,723,391
[45] Date of Patent: Feb. 9, 1988

[54] CONTAINERS

[75] Inventors: Robert J. Ashley, Faringdon; John D. Miller, Didcot; Maurice F. Ring, Wantage, all of United Kingdom

[73] Assignee: Metal Box Public Limited Company, Berkshire, England

[21] Appl. No.: 908,708

[22] PCT Filed: Dec. 11, 1985

[86] PCT No.: PCT/GB85/00569
§ 371 Date: Sep. 29, 1986
§ 102(e) Date: Sep. 29, 1986

[87] PCT Pub. No.: WO86/03474
PCT Pub. Date: Jun. 19, 1986

[30] Foreign Application Priority Data

Dec. 13, 1984 [GB] United Kingdom ............... 8431447

[51] Int. Cl.$^4$ .............................................. B65B 61/18
[52] U.S. Cl. ....................................... 53/412; 53/133
[58] Field of Search ............... 53/412, 487, 133, 141; 156/69; 220/270; 493/87, 117, 212, 381, 382, 923, 963

[56] References Cited

U.S. PATENT DOCUMENTS

| | | |
|---|---|---|
| 2,034,007 | 3/1936 | Smith .................................. 220/270 |
| 2,870,935 | 1/1959 | Houghtelling ....................... 220/270 |
| 3,166,234 | 1/1965 | Amberg ............................ 53/412 X |
| 3,287,878 | 11/1966 | Mobley ............................ 53/412 X |
| 3,318,495 | 5/1967 | Roberts ........................... 220/270 X |
| 3,381,884 | 5/1968 | Herritty ............................... 229/51 |
| 3,790,424 | 2/1974 | Young, Jr. et al. ................. 156/379 |
| 4,029,033 | 6/1977 | Kerwin ............................ 156/69 X |
| 4,191,195 | 2/1979 | Mueller ................................ 53/412 |
| 4,208,852 | 6/1980 | Pioch .................................... 53/167 |
| 4,544,080 | 10/1985 | Wright ........................... 220/270 X |

FOREIGN PATENT DOCUMENTS

| | | |
|---|---|---|
| 30649 | 11/1980 | European Pat. Off. . |
| 1274143 | 11/1960 | France . |
| 1320350 | 1/1963 | France . |
| 418268 | 2/1934 | United Kingdom . |
| 915596 | 11/1960 | United Kingdom . |
| 1175582 | 1/1967 | United Kingdom . |
| 1341587 | 6/1971 | United Kingdom . |
| 1262461 | 2/1972 | United Kingdom . |
| 402069872 | 2/1981 | United Kingdom . |

Primary Examiner—John Sipos
Attorney, Agent, or Firm—Wood, Dalton, Phillips, Mason & Rowe

[57] ABSTRACT

A method of making a succession of food or beverage containers each comprising a vessel having a mouth surrounded by a rim presenting an upper surface of plastics material. The method comprises filling each vessel in turn and feeding over the vessel a continuous composite web of lidding material produced by forming spaced apart perforations, each comprising at least one through hole, in a continuous first web of diaphragm material having a plastics surface weldable to the vessel rim. The method also comprises forming spaced apart pull tabs in a continuous second web of peel strip material by folding each of a succession of portions of the second web against itself to form each pull tab and subsequently applying and peelably securing the second web which is narrower than the first web to the first web so as to obturate the perforations such that one pull tab is situated adjacent each perforation and remains secured to the second web only at a junction on its one end. Moreover, the method comprises cutting a lid from the web and securing the lid by an endless peripheral weld to the upper surface of the rim thereby closing the vessel.

8 Claims, 15 Drawing Figures

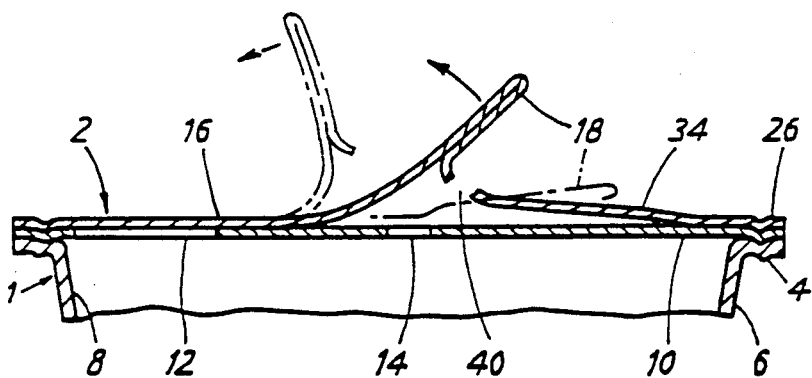
FIG.3
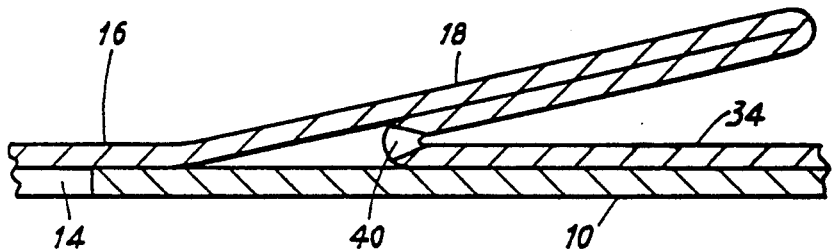
FIG.4
FIG.5
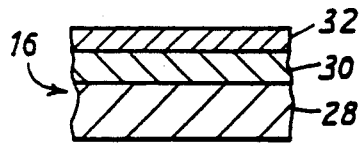
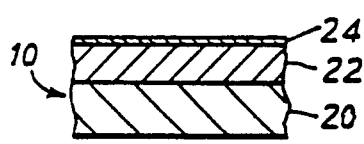
FIG.6
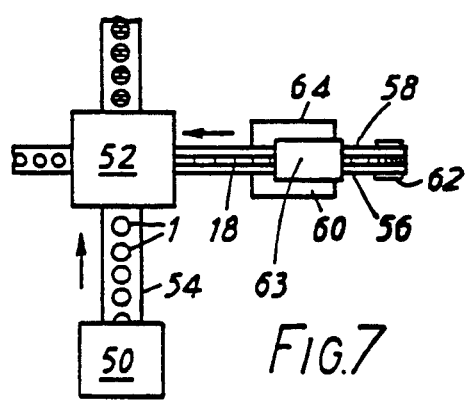
FIG.7

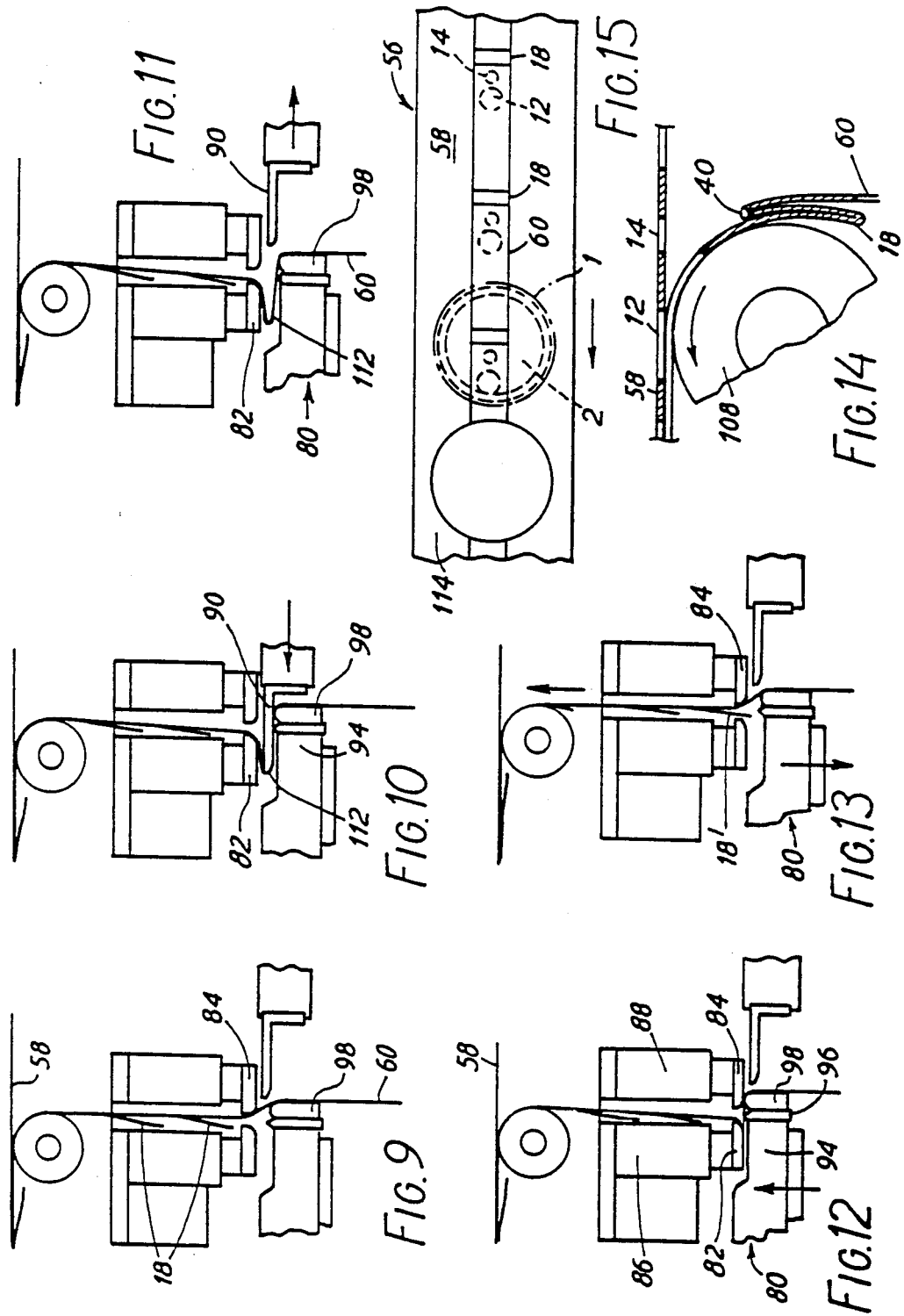

CONTAINERS

This invention relates to containers for foodstuffs and beverages comprising a container body at least the inner surface of which is of plastics material, especially though not exclusively those in which such products are sold for consumption direct from the container itself; to methods of making such containers and to apparatus for performing such methods.

A method of packaging for foodstuffs and beverages that is becoming increasingly common is that known as aseptic packaging. Conventional canning and bottling processes rely on the application of heat to the product, in its hermetically-sealed can or other container, in order to achieve the degree of sterilization (pasteurisation) needed to ensure the survival of the product, in a usable condition at ambient temperatures, for a sufficient length of time. Aseptic packaging processes are those which, instead of relying on the application of heat, achieve this end result by ensuring that the product is, at the time of being packaged, not contaminated by any undesirable or harmful organisms or spores, and that it is packed in a container of which all the components are sterilised to a commercially-acceptable degree, and remain so until they have been hermetically sealed with the product inside. Aseptic packaging is suitable for any product which is capable of surviving in a usable condition for a satisfactorily long, but predetermined, period of time in a hermetically sealed container (i.e. without deteriorating due to its own inherent characteristics).

While a wide variety of containers can be used for aseptic packaging, including metal cans, the absence of any need for high-temperature sterilisation renders less expensive forms of container, which would not survive the application of heat for sterilisation purposes, more attractive. Plastics pots and other containers of plastics are thus popular for aseptic packaging, particularly since they can readily be sterilised immediately prior to being filled, the commonest method of achieving such sterilisation being by treatment with hydrogen peroxide followed by a suitable brief heat treatment.

Aseptic packaging is normally carried out in a sterile atmosphere at a pressure slightly above the prevailing ambient pressure, and is therefore performed in a suitable enclosed space. The process is accordingly made as nearly fully automatic as possible, including of course the operation of closing each filled container.

Thus, if the container components, such as container body and the end closure member to be applied so as to seal the filled container, are each pre-manufactured, the process of sterilising the components and feeding them to the closing station of the packaging plant need normally present no particular difficulties.

End closure members for plastics pots used in aseptic packaging processes normally comprise a foil or other flexible diaphragm where there is no requirement for eventual opening of the container other than simple removal of the closure. However, often the product is such that the consumer will expect to be able to gain access to the contents of the container without fully removing the end closure member, for example where the contents are to be drunk direct from the container. It is now usual in such cases to use a conventional metal can end of the so-called "easy opening" kind having a weakened portion which is removed by pulling on a metal pull tab or other similar device.

While a filled plastics pot with a metal easy-opening can end constitutes a pack that is both technically satisfactory and attractive in appearance, it remains true that the metal can end is a relatively expensive component, and this must be reflected in the extent to which the use of aseptic packaging systems can be developed. As an alternative, a conventional closure diaphragm can of course be provided, which must be removed fully before use. However, where there is a requirement that the container, filled with a beverage, should be capable of serving as a drinking vessel, such a conventional closure has two serious disadvantages. The diaphragm in these cases is sealed to the rim of the container body by means of a peelable joint (obtained either by use of heat sealing or by employing a suitable peelable adhesive). Difficulties are sometimes encountered in achieving satisfactory or reliable peelable seals between components made from the materials currently favoured in aseptic packaging, this is particularly true if the seal area becomes contaminated with the product with which the container is to be filled. In addition, when the diaphragm is removed by peeling it away from the rim of the container body, a residue of heat sealing resin or adhesive is sometimes left on the rim. A further disadvantageous possibility is that the rim may have a rough edge which can prove uncomfortable to the consumer drinking from the container.

According to the invention, in a first aspect, a container for foodstuffs and beverages comprises a container body, at least the inner surface of which is of plastics material and having a rim defining a mount of the body, and a lid comprising a diaphragm welded over the whole of its periphery to the rim and covering the mouth of the body, the diaphragm having at least one through hole and a peel strip sealingly but peelably secured over the through hole or holes, the peel strip having a pull tab.

Such a container thus has a lid which provides an alternative "easy-opening" end closure to the conventional metal kind, permitting a beverage to be drunk direct from the container without the need to peel the whole diaphragm from the container body. By welding the lid to the body, the other drawbacks of providing a peripheral peelable seal are also avoided. It will be seen that the container according to the invention is eminently suitable for use in aseptic packaging processes, and for containing products intended for drinking. However, the container may contain foodstuffs other than beverages, and need not be filled or closed aseptically. One example of such other products is dry, particulate foodstuffs.

Preferably, the diaphragm and peel strip are each of laminated construction having barrier properties substantially similar to those of the container body, whereby the container is hermetically sealed. The diaphragm and peel strip would be of materials so formulated that the surfaces presented to the contents of the container are acceptable under food safety regulations for use with hydrogen peroxide sterilisation procedures.

The peel strip may be in the form of a strip extending transversely across the diaphragm, preferably from one side to the other. As will be seen, this lends itself to a simple method of making the lid, particularly suitable in the automatic methods associated with aseptic packaging.

Preferably, the pull tab is located at an intermediate position on the peel strip, the peel strip being secured to the diaphragm at the ends of the peel strip and at least locally of the through hole or holes. The peel strip may be otherwise unsecured to the diaphragm. Alternatively it may be totally secured to the diaphragm.

The pull tab can most conveniently comprise a portion of the peel strip folded back on itself, in which case the peel strip preferably has a transverse cut across part of its width at the junction of the pull tab with the remainder of the peel strip on the side of the pull tab remote from said at least one through hole.

The diaphragm is preferably of laminated construction including an inner layer of metal foil or a polymeric barrier material.

The peelable joint between the peel strip and the diaphragm may be obtained by use of a suitable adhesive, but preferably the diaphragm is of laminated construction including an outer layer of a lacquer heat sealed to the underside of the peel strip to form a sealable but peelable interface. The peel strip is preferably also of laminated construction including a barrier layer of metal foil or a polymeric material. A lower layer of the peel strip, adjacent the diaphragm, is preferably of polymeric material. The materials of the laminations may be such that all the lower layer of the peel strip is of polypropylene.

According to the invention, in a second aspect, a method of making a succession of containers according to the invention includes the operations of forming the through holes in a continuous web of the material for the diaphragms of the containers, applying peel strip material to the said diaphragm material so as to obturate the through holes, cutting each successive lid from the web, and welding each successive lid around the whole of its periphery to a filled container body.

Preferably the peel strip material is in the form of a continuous web, in the operation of applying it to the diaphragm material, is juxtaposed with the web of diaphragm material so as to obturate the through holes.

The method preferably includes the step of heat sealing to the diaphragm material at least those parts of the peel strip material that surround the hole or holes destined for each individual lid, prior to the operation of cutting the respective lid from the web.

In addition, the method preferably includes the additional operation of forming each successive pull tab from the web of peel strip material prior to the latter being applied to the web of diaphragm material. The preferred way of achieving this is that each pull tab is formed by folding a portion of the web of peel strip material against itself and then applying heat to the folded portion to bond together the two folded halves thereof, all with the web of peel strip material stationary. Preferably, the method includes the step of sterilising the webs after the peel strip material has been applied to the diaphragm material, so that each lid is cut from sterilised material.

According to the invention, in a third aspect, apparatus for performing the above method includes feed means for feeding the web of diaphragm material and feed means for feeding the web of peel strip material into aligned facial contact with each other at a peel strip application point, both of said feed means being operable in intermittent movement so as to allow a succession of dwell periods for operations on the webs, perforating means arranged for making the through hole or holes destined for each individual lid in the web of diaphragm material prior to each perforated portion reaching the application point, and tab-forming means arranged for forming each successive pull tab in the web of peel strip material prior to the pull tab so formed reaching the application point.

An embodiment of the invention will now be described, by way of example only, with reference to the drawings of this application, in which.

Figure 2:
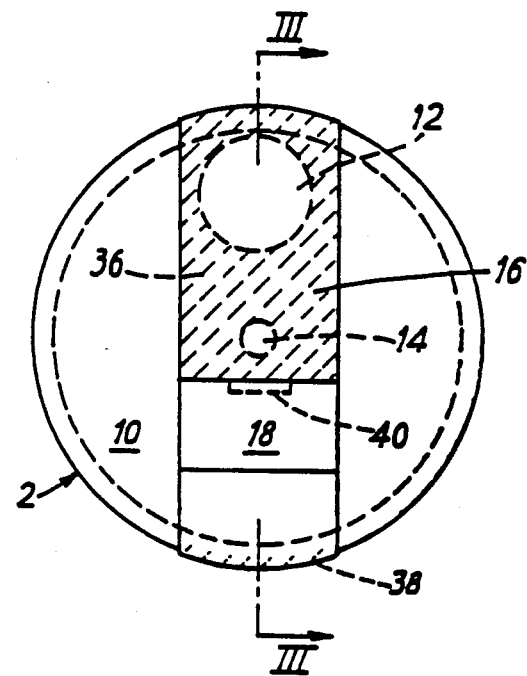
FIG. 2 is a plan view of the same container.
Figure 8:
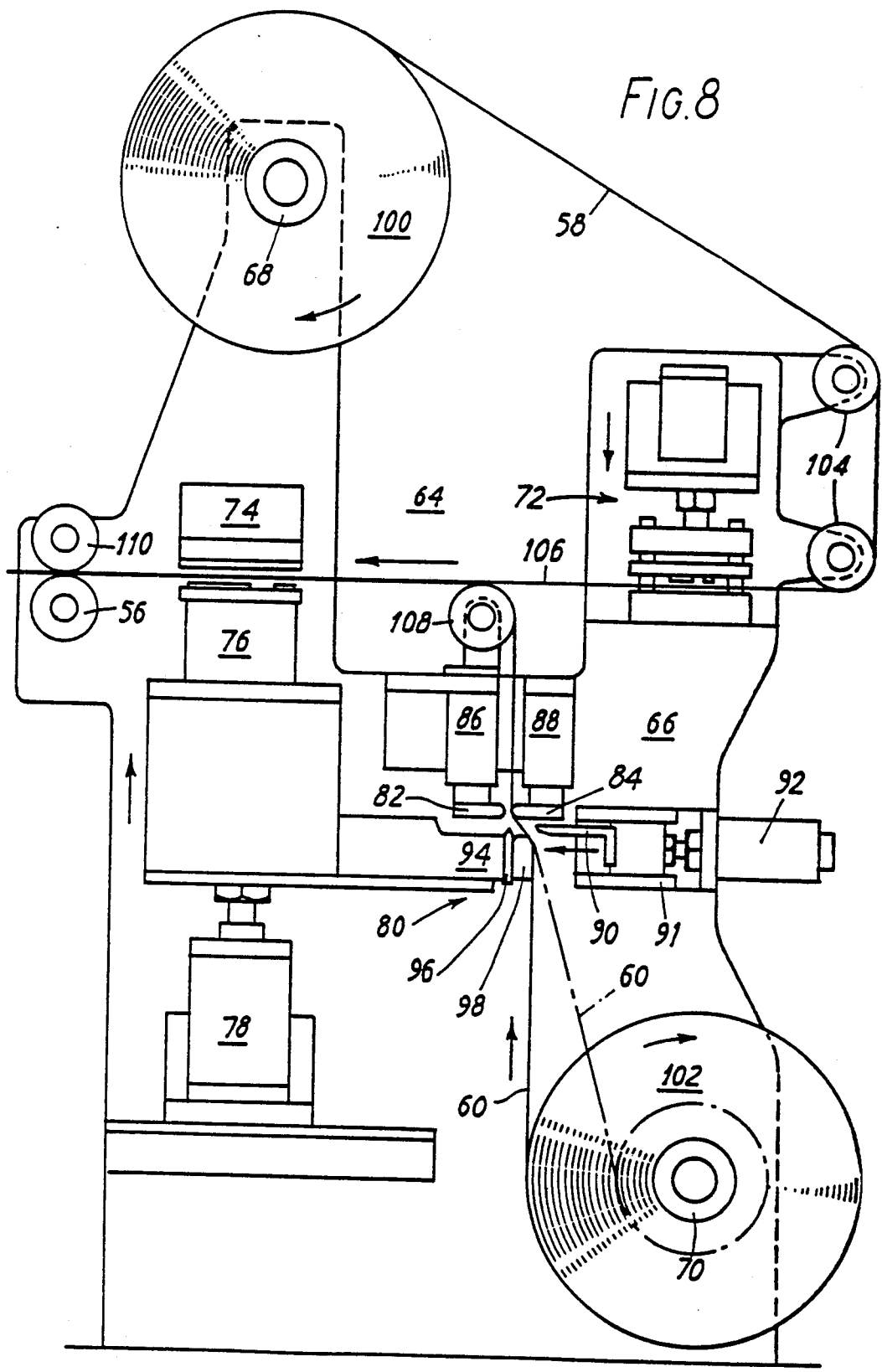

FIG. 3 is an enlarged sectional elevation, taken on the line III—III in FIG. 2, and showing the lid of the container, FIG. 4 is an enlarged scrap section through a pull tab of the container, FIG. 5 is a greatly enlarged scrap section through a portion of the peel strip of the container, FIG. 6 is a similar view through a portion of the diaphragm, FIG. 7 is a diagrammatic representation of part of a filling and closing apparatus using containers according to the invention, FIG. 8 is a highly-simplified and somewhat diagrammatic side elevation of a machine for making a continuous strip of lidding material from which the lids of the containers are subsequently cut, FIGS. 9 to 13 show a part of the same apparatus, in five stages of the process of forming a pull tab for a said lid, FIG. 14 is a much-enlarged detail taken from FIG. 13, and FIG. 15 is a plan view on the above-mentioned continuous strip of lidding material at the place where a lid is cut from it.

Referring to FIGS. 1 to 4, the container shown in these Figures comprises a container body 1 and a lid 2. The body 1 is a slightly downwardly tapered pot or cup, having an open mouth at its top end defined and surrounded by a rim 4, which in FIG. 3 is shown as an outwardly directed curl or flange, but which may merely comprise a bead or thickening of the end of the sidewall 6 of the cup. The container body 1 may be of any suitable material or combination of materials, but at least its inner surface 8 is of a plastics material. The cup 1 may itself be entirely conventional, and made of a single plastics material having sufficiently high gas barrier properties for the purpose of which the container is to be used. More usually it will be formed from sheet material by a conventional thermoforming process, the sheet material having at least two coextruded layers, one of the layers being of a high-barrier material such as one of the polymeric high-barrier materials that are currently commercially available. Examples of such materials are those sold under the trade marks SARAN and EVAL. Whatever form of construction, or materials, are used for the container body, its inner surface 8 is of a plastics material suitable for being welded to the underside of the lid 2. The inner surface 8 will thus typically be of the same material as the underside of the lid, and may for example be of low density polyethylene, high density polyethylene, or polypropylene.

The lid 2 comprises a circular diaphragm 10 having two through holes, namely a relatively large pouring or drinking hole 12 and a smaller hole 14 which serves as an air vent. Extending diametrically across the diaphragm 10, and extending from one side of the latter to the other, is a peel strip 16. The peel strip 16 covers the holes 12 and 14 and has a pull tab 18 for the purpose of removing the strip so as to expose the holes. As will be seen, the peel strip is secured to the diaphragm sealingly, but can be readily peeled away from it when it is desired to open the container.

Both the diaphragm 10 and the peel strip 16 are of laminated construction, typically as illustrated in FIGS. 5 and 6. Referring to these two Figures, the diaphragm 10 has a base or inner layer 20, an outer layer 24, and between the layers 20 and 24 a barrier layer 22. The inner layer 20 is preferably of the same material as the inner surface 8 of the container body 1, but is in any case of a material suitable to be welded to the latter to form a fused hermetic seal. Subject to this, the layer 20 and the inner-most layer of the cup 1 are of any suitable material or materials, such as polyolefins. Specific examples include low density polyethylene, high density polyethylene, and polypropylene. These two layers are welded together by a fused heat seal bond around the entire periphery of the rim 4 of the cup, as indicated at 26 in FIG. 3. The barrier layer 22 of the diaphragm is for example of aluminium foil, but it may be of a polymeric material. Its outer layer 24 consists of a thin coating of a protective lacquer which must be of a kind suitable for allowing the peel strip 16 to be peelably but sealingly secured to it. This lacquer must also be sufficiently resistant to heat not to stick to the tooling which is used to form the welded peripheral joint at 26 around the diaphragm. Suitable materials for the outer layer 24 of the diaphragm include lacquers based on epoxy resin and satisfying the above criteria, and a lacquer which is based on a blend of an epoxy resin with a maleic anhydride modified polypropylene at a coat weight of between 2 and 10 grams per square meter. An example of this last-mentioned type of lacquer is that sold by Morton Chemical Limited under the Trade Mark MOR-PRIME 78 HB 76A.

The thickness of the inner layer 20 of the diaphragm is in the range 30 to 100$\mu$ (0.03-0.1 mm) and is preferably 50 to 75$\mu$ (0.05-0.075 mm). The aluminium foil barrier layer 22 has a thickness of 20-50$\mu$ (0.02-0.05 mm), while the lacquer outer layer 24 is somewhat thinner than either of the other two layers.

The lamination structure of the peel strip 16 is somewhat different, though like that of the diaphragm, the lower or inner layer 28 is in direct contact (in this case through the holes 12 and 16 in the diaphragm) with the contents of the container. Both of the inner layers 20 and 28 must therefore be of materials acceptable for use with foodstuffs. In addition, the layer 28 and the upper layer 24 of the diaphragm must be capable of making at the interface a reliable hermetic seal which is also robust enough to withstand a certain amount of abuse in handling and transport, yet which will permit the peel strip 16 to be readily peeled away when it is time to open the container. At least with the layer 24 of a lacquer such as those mentioned above, polypropylene is the preferred material for the peel strip lower layer 28.

The peel strip 16 comprises the inner layer 28, a barrier layer 30, and an outer layer 32. The barrier layer 30 and outer layer 32 may be of any suitable materials. In three non-limiting examples, they are, respectively of (a) aluminium foil and a polyester film, (b) the polymeric barrier film material sold under the Trade Mark SARAN, and a nylon, or (c) a barrier film material sold under the Trade Mark EVAL, and a nylon. The two last-mentioned cases are examples in which the peel strip is transparent. Besides enhancing the appearance of the pack, the use of a transparent peel strip enables the holes 12 and 14 to be seen while the container is still closed, thus making it easier for some consumers to understand how to open it.

The thickness of the inner layer 28 of the peel strip at least if of polypropylene, is in the range 30–100$\mu$ (0.03–0.1 mm), i.e. similar to that of the diaphragm inner layer 20. That of the barrier layer 30, if of aluminium foil, is 9 to 40$\mu$ (0.009–0.4 mm) and preferably 9 to 20$\mu$ (0.009–0.2 mm), while the outer layer, if of polyester, has a typical thickness of 12$\mu$ (0.012 mm).

The layers of the laminated materials may be bonded together using known co-extrusion techniques, or by the use of conventional adhesives such as those of polyurethane.

The criteria for peelability of the strip 16 from the diaphragm 10 are as stated above, and peel strength may be controlled, so as to satisfy these criteria, by selection of the correct blend of lacquer for the outer layer 24 of the diaphragm. For example, unmodified polypropylene may be added to the basic lacquer in order to adjust its concentration. The lacquer of layer 24 is preferably applied as a coating from a suitable dispersion. Containers having a lid made from the laminated materials given as specific examples above satisfy the requirements of the United States Food and Drug Administration for packaging which is to be subjected to hydrogen peroxide sterilisation in an aseptic packaging process. The barrier layers 30 and 22 should be such as to have gas barrier properties at least as great as those of the container body 1.

Reverting to FIGS. 1 to 4, the pull tab 18 is an integral part of the peel strip 16. While it may be example be arranged at one end of the strip 16, in this example the pull tab is located at an intermediate position on the peel strip. The peelable seal between the strip 16 and diaphragm 24 is not necessarily formed over the whole area of the former, but may only be in the areas represented by broken hatching at 36 and 38 in FIG. 2. These areas lie at the ends of the peel strip 16 and in the area extending between the pull tab 18 and the end of the peel strip nearest the hole 12, so that the region local to the through holes 12 and 14, and surrounding them is totally sealed. There may thus be a region, indicated at 34 in FIGS. 3 and 4, behind the pull tab, in which the peel strip 16 is unsecured to the diaphragm 10.

The pull tab 18 is formed simply by folding a portion of the peel strip material back on itself. At the base of the pull tab, a transverse cut 40 (FIG. 4) is made across part of the width of the pull tab, through the rearward one only of the two folded halves of the folded portion, i.e. through the right hand half only of the thickness of the pull tab as seen in FIG. 4. This establishes the direction in which the peel strip is most easily removed.

Figure 1:
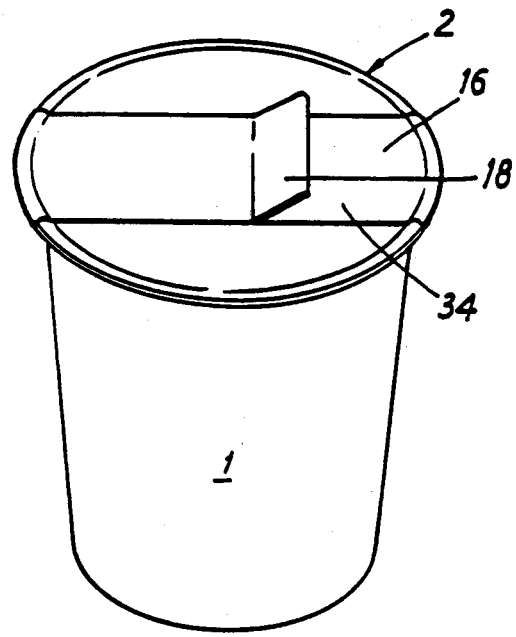
FIG. 1 is a perspective view of a container according to the invention.

When the container has been filled, and closed by welding the lid 2 to the container body 1, the pull tab 18 lies flat over the region 34 or is inclined upwardly somewhat as indicated in FIGS. 1 and 4. To open the container, the pull tab is gripped between finger and thumb, and pulled. Because of the cut 40, the direction in which the peel strip will tend to move most readily is as indicated in FIG. 3. The peel strip portion 34 tends to lift and the pull tab 18 is hinged forwards so as first to break the peel strip 16 at the portion weakened by the cut 40, and then to peel the strip from over the holes 14 and 12. The user can then drink from the hole 12.

Referring now to FIG. 7, this diagram crudely represents elements of an aseptic packaging line for packing a beverage, such as fruit juice in a succession of containers of the kind described above with reference to FIGS.

1 to 6. The container bodies (pots) 1 are filled with juice at a filling station 50, whence they are conveyed to a closing station 52 by an intermittently-moving conveyor 54. If this equipment is part of an eseptic packing line, there will be, associated with the filling station 50, apparatus (not shown) of a suitable known kind for sterilising the containers, there being also suitable means of a known kind for retaining the sterility at least up to a point downstream of the closing station 52.

The movement of the conveyor 54 is synchronised with the action of the filling apparatus (not shown) at the filling station 50, and with that of the closing apparatus (not shown) at the closing station 52 at which the lid of each successive pot is welded to the latter in the manner already described. Filling and closing take place when the conveyor is at rest. Also at the closing station 52, successive lids are cut from a continuous cover strip 56, of lid material, which is advanced towards and through the station 52 in synchronism with the movement of the conveyor 54. The closing apparatus may be of any conventional kind suitable for cutting successive thin flexible diaphragm-type lids from a continuous strip and applying them to close a container mouth with application of heat to effect a seal.

The continuous cover strip 56, as will be seen shortly, comprises a web 58 of diaphragm material (for example as described with reference to FIG. 6) having the holes 12 and 14 (not seen in FIG. 7) and with, secured along it, a continuous web 60 of peel strip material with the pull tabs 28 already formed. The cover strip is advanced, pull tabs 18 uppermost, via suitable means such as feed roller 62, from a cover strip forming machine 64. After leaving the forming machine 64, the strip 56 is passed through a sterilising unit 63 (of any suitable known type), so that the lids are then cut from sterilised material.

Reference is now made to FIG. 8, which shows the forming machine 64. A machine frame 66 carries a diaphragm web spool 68 at the top, and a peel strip web spool 70 at the bottom, these spools being carried on shafts freely-rotatable in the frame 66. Also carried by the machine frame are a press tool 72, a horizontal main heat sealing anvil 74, and a main heat sealing head 76 which is reciprocable vertically against the anvil 74 by means of a main piston-and-cylinder actuator 78, carried by the frame 66. Carried by the piston of the actuator 78, besides the main heat sealing head 76, is a tab sealing head 80, which lies below a pair of opposed anvils 82 and 84. The anvils 82 and 84 are carried by respective anvil guides 86 and 88, which extend vertically to define between them a vertical gap, and which are fixed to the machine frame 66. The anvils are resiliently mounted in the guides 86 and 88, for limited vertical movement therein. Lying below the right-hand anvil 84, in FIG. 8, is a folding plate 90, which is reciprocable horizontally in a fixed slide 91 by a further actuator 92 carried by the frame 66. The folding plate 90 is so positioned as to be reciprocable between the tab-sealing head 80 and the anvils 82, 84 above it.

The purpose of the tab sealing head 80 is to cause the two folded halves of each pull tab 18 to adhere to each other, as will be described. The head 80 comprises a heat-sealing unit 94 and a cutting block 96, and terminates in a guide block 98 which lies vertically below the right-hand anvil 84.

In operation, a coil 100 of the diaphragm web 58, and a coil 102 of the peel strip web 60, are mounted on the respective spools 68 and 70. The diaphragm web 58 extends from its coil over idler rollers 104 and into a horizontal run 106 which extends through the press tool 72. The tool 72 is of conventional construction, and operates to form the holes 12 and 14 through the web 58. The run 106 continues to a point at which it makes the peel strip web 60 on a guide roller 108, carried by the frame 66 and freely rotatable.

The web 60 extends upwardly from its coil 102 to a reverse bend, which is formed by the web bearing first on the guide block 98 and then on the right-hand anvil 84, from whence the web passes through the gap between the anvil guides 86, 88 and over the guide roller 108. The horizontal run 106, now comprising both webs, continues through the gap between the main anvil 74 and main heat-sealing head 76 and thence between a pair of drive rollers 110.

The rollers 110 are driven in intermittent rotation so as to draw the cover strip 56 forward, the coils 100 and 102 unwinding accordingly. The actuators 78 and 92 and the press tool 72 are operated during the stationary periods. The indexing means by which the timing of the operations of the various components is controlled is conventional and is not shown. It should be noted that, although preferably the forward speed of the cover strip 56 should be exactly the same on exit from the strip forming machine 64 as on entering the closing station 52 (FIG. 7), it is not essential that the drive rollers 110 be linked or synchronised with the closing apparatus at the station 52. The cover strip may for example be formed into a coil and stored for subsequent use at the same or another site.

As the coil 102 of peel strip web unwinds, it continues to bear upon the guide block 98, as indicated by phantom lines in FIG. 8.

Referring now to all of FIGS. 8 to 13, one cycle of operation of the strip forming machine 64 will now be described. At the commencement of the cycle the drive rollers 110, which have been indexing the cover strip 56 forward, stop. The configuration is now as seen in FIGS. 8 and 9, the actuators 78 and 92 being in their retracted positions as shown. The webs 58 and 60 now being at rest, the press tool 72 operates so as to form a through hole 12 and an adjacent hole 14 (FIG. 2) in the diaphragm web 58. At the same time, the actuator 92 is energised, driving the folding plate 90 forward as shown in FIG. 9. This forms a bight 112 in the peel strip web 60, at the same time drawing a small portion of the web 60 from the coil 102. The bight 112 lies in the gap between the heat seal unit 94 and the lefthand anvil 82.

The folding plate 90 is now withdrawn, leaving the bight 112 supported between the anvil 82 and the tab sealing head 80 (FIG. 11). The main actuator 78 is then operated. This drives the main heat sealing head 76 upwardly to apply heat to the webs 58 and 60 against the main anvil 74. It should be noted that the head 76 is so configured that it applies heat only over selected portions of the webs such as to heat seal the peel strip web to the diaphragm web in those areas which, when that part of the cover strip 56 is later cut out to form a lid 2, will constitute the areas required to be sealed, for example as seen in FIG. 2.

The operation of the main actuator 78 at the same time drives the tab sealing head 80 towards the two anvils 86 and 88, as shown in FIG. 12, the heat sealng unit 94 being simultaneously energised. The web 60 thus becomes clamped between the guide block 98 and the right-hand anvil 84, while the bight 112 becomes tightly folded and clamped between the unit 94 and the other anvil 86. The heat sealing unit 94 causes the two halves of this folded portion to adhere together, thus forming a pull tab 18. At the same time the cutting blade 96 pierces the web 60, to form the cut 40 shown in FIGS. 2 and 4, in the exposed portion of the web between its two clamped areas. To avoid damage to the web 60, the anvils 82 and 84 may retract upwardly by a small amount in their guides 86 and 88 respectively.

Finally, the main actuator 76 is retracted so as to restore the machine to the conditions at the start of the cycle, whereupon the drive rollers 110 begin to rotate again, drawing the webs forward (FIG. 13) by a distance equal to one pitch between successive lids. In FIG. 13, the pull tab the formation of which has just been described is indicated at 18'.

In high-speed operation, cooling of the sealed tab may be required. This may be achieved by blowing cold air over it (by means not shown).

FIG. 14, in which the webs 58 and 60 are shown partly in section, illustrates the relative positions of a newly-formed pull tab 18 and the holes 12 and 14 as the two webs come into contact with each other on the roller 108 with the web 60 obturating the holes 12 and 14. Also shown in FIG. 14 is the manner in which the pull tab is folded back against the peel strip web 60 as it passes over the roller 108, thus ensuring that when it forms part of a lid 2, the pull tab is orientated correctly (as in FIG. 1) ready for use by the consumer.

The cover strip 56 made by the process described above is illustrated in FIG. 15. At the closing station 52 (FIG. 7), a lid 2 is punched from the strip 56 over a filled container body 1 before being welded to the latter, leaving a scrap portion of the cover strip, as at 114, to be removed in any suitable manner.

We claim:

1. A method of making a succession of food or beverage containers, each comprising a vessel having a mouth surrounded by a rim presenting an upper surface of plastics material, the method comprising filling each vessel in turn, feeding over the vessel a continuous composite web of lidding material produced by forming spaced apart perforations each comprising at least one through hole, in a continuous first web of diaphragm material having a plastics surface weldable to the vessel rim, forming spaced apart pull tabs in a continuous second web of peel strip material by folding each of a succession of portions of the second web against itself to form each said pull tab, and subsequently applying and peelably securing the second web, which is narrower than the first web, to the first web so as to obturate the perforations such that one said pull tab is situated adjacent each perforation, the tab remaining secured to the second web only at a junction on its one end, cutting through the two secured continuous webs to form a lid in which the peel strip material is substantially coextensive with the diaphragm material, and securing the lid by an endless peripheral weld to the upper surface of the rim, thereby closing the vessel.

2. The method according to claim 1, comprising making a transverse cut across part of the width of the second web at the location of the junction of the pull tab with the remainder of the second web.

3. The method according to claim 2, wherein the said steps of folding and of making a transverse cut are performed simultaneously.

4. The method according to claim 1, comprising the step of heat sealing to the first web at least those parts of the second web that surround the perforations destined for each individual lid, prior to the operation of cutting the respective lid from the composite web.

5. The method according to claim 1, comprising the step of sterilizing the composite web after the second web has been applied to the first web, so that the composite web is fed to the vessel in a substantially sterilized state.

6. The method according to claim 1, wherein the vessel is filled and closed under substantially sterile conditions.

7. The method according to claim 1, providing feed means for feeding the first web, and providing feed means for feeding the second web into aligned facial contact with each other at an application point, both of said feed means being operable in intermittent movement so as to allow a succession of dwell periods for operations on the webs, perforating means arranged for making the perforation to each perforated portion of the first web reaching the application point, and further tab-forming means arranged for forming each successive pull tab in the second web prior to the pull tab so formed reaching the application point.

8. The method according to claim 7, wherein the tab-forming means includes further perforating means for making a transverse cut across part of the width of the second web at the location of the rearward junction of the pull tab with the remainder of the second web.

* * * * *